United States Patent [19]

Reshetin

[11] Patent Number: 4,962,450

[45] Date of Patent: Oct. 9, 1990

[54] LIGHT SIGNALLING DEVICE

[76] Inventor: Evgeny F. Reshetin, 5 ulitsa Sokolinoi gory, 19, kv. 96., Moscow, U.S.S.R.

[21] Appl. No.: 271,955

[22] PCT Filed: Jan. 7, 1988

[86] PCT No.: PCT/SU88/00007

§ 371 Date: Sep. 16, 1988

§ 102(e) Date: Sep. 16, 1988

[87] PCT Pub. No.: WO88/05584

PCT Pub. Date: Jul. 28, 1988

[30] Foreign Application Priority Data

Jan. 19, 1987 [SU] U.S.S.R. ............................ 4183840
Jan. 19, 1987 [SU] U.S.S.R. ............................ 4184103

[51] Int. Cl.[5] ............................................ F21V 13/04
[52] U.S. Cl. .................................. 362/268; 362/296; 362/297; 362/299; 362/328
[58] Field of Search ............... 362/268, 296, 297, 298, 362/299, 303, 61, 80, 326, 327, 328; 340/815.32; 313/111, 113, 114

[56] References Cited

U.S. PATENT DOCUMENTS

| 1,194,758 | 8/1916 | McCarthy | 340/815.32 |
| 2,243,448 | 5/1941 | Wells et al. | 340/815.32 |
| 3,283,142 | 11/1966 | Freeman | 313/114 |

FOREIGN PATENT DOCUMENTS

| 362686 | of 1981 | Austria . | |
| 0424062 | 1/1926 | Fed. Rep. of Germany | 340/815.32 |
| 1075067 | 5/1952 | Fed. Rep. of Germany | 362/296 |
| 1951199 | of 1973 | Fed. Rep. of Germany . | |
| 2169183 | of 1973 | France . | |
| 1591013 | of 1981 | U.S.S.R. . | |
| 1173128 | of 1985 | U.S.S.R. . | |
| 2069124 | of 1981 | United Kingdom . | |

OTHER PUBLICATIONS

Ju. A. Kremenets, M. P. Pechersky "Tekhnicheskie sredstva regulirovania dorozhnogo dvizhenia", 1981.

Primary Examiner—Ira S. Lazarus
Assistant Examiner—Sue Hagarman
Attorney, Agent, or Firm—Lilling and Lilling

[57] ABSTRACT

A light signalling anti-phantom device includes a collimator with a reflector (2), a light source (1) disposed in the focal point (F) of the collimator, and an absorber (3) of light. The reflector (2) and absorber (3) are arranged so that any focal ray (4) directed in opposition to the focal ray (5) incident on the reflector (2) falls on the absorber (3). The reflector (2) may be a mirror or catadioptric rings (23) exhibiting total internal reflection. This design eliminates false external illumination signals and makes light signals more contrast during daytime.

14 Claims, 4 Drawing Sheets

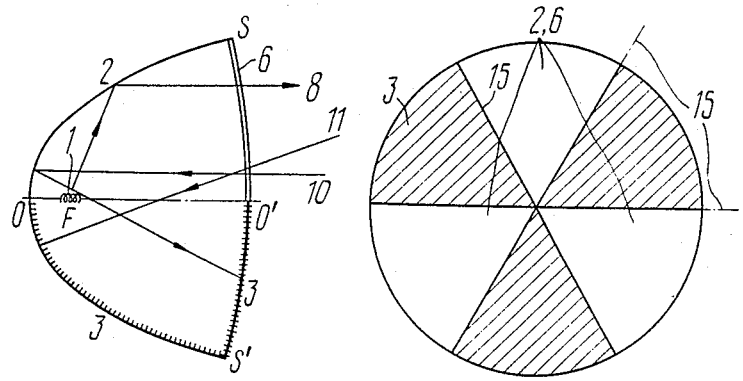
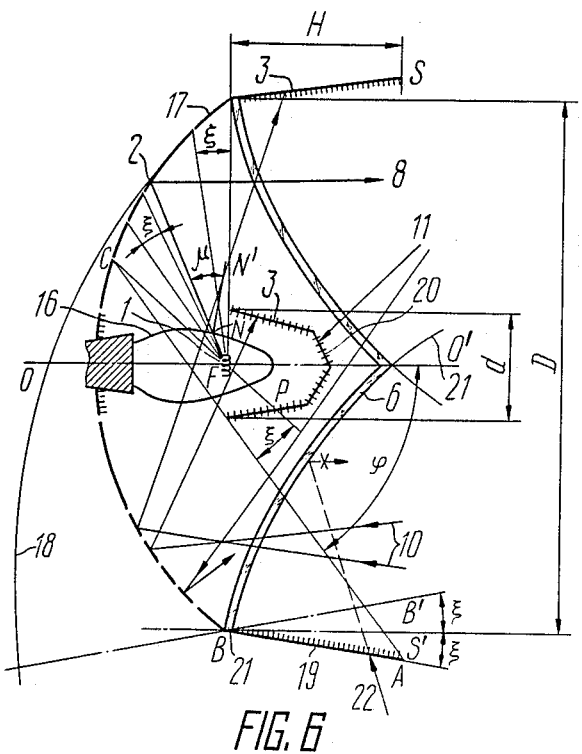
FIG. 4
FIG. 5
FIG. 6

LIGHT SIGNALLING DEVICE

BACKGROUND OF THE INVENTION

1. Field of the Invention

The present invention relates to lighting engineering and, more specifically, to a light signalling device.

2. Description of the Prior Art

Readibility of light signal in the daytime, i.e. the ability of an observer to determine without error and during a short time the state of a signal light (e.g. whether the traffic light is on) depends both on the signal intensity and on the background illumination. External illumination causes flashes from the optical element, reduces the signal contrast or even produces false signals ("phantom effect"). The flashes may be seen in any direction. However, the phantom effect acting in the information-valued direction (along the self-radiation axis and in directions close to this axis) is especially harmful. To eliminate the phantom effect in stationary light signalling devices (traffic lights), sun visors are used, however, these have low efficiency in a low angular position of the sun and significantly increase the overall dimensions of the device. In automobile signal lights, where the visors can hardly be used, the required contrast is obtained due to high light intensity. Stringent requirements to traffic safety necessitates higher intensity of the signal lights, which, however, cause glare by these lights at night. At the present time there are known optical systems, in which the phantom effect is eliminated using components, which are very expensive and can hardly mass-production motor cars.

Known in the art is a contrast light signalling device (GB, A, No. 1591013) comprising a concave reflector with a light source at the focal point thereof. In order to eliminate the phantom effect, the output aperture of the reflector is closed by a light absorbing screen having fine holes, through which the useful radiation is guided by means of lens rasters.

The idea of a light absorbing screen with light conducting holes is the basis of many later inventions (SU, A, No. 1173128). However, practical realization of this idea needs overcoming technological difficulties associated with making of perforated screens and rasters.

The concave reflector of a light signalling device may be either mirror-type or catadioptric, i.e. made of a transparent material in the form of prismatic elements featuring complete internal reflection (GB, A, No. 2069124). Both the catadioptric and mirror reflectors to be used in the light signalling devices require special arrangement against external illumination.

A device, which in its technical essence is close to the claimed solution, is a directional light signalling device—traffic light (Yu. A. Kremenets. M. P. Pechersky in the book "Technicheskie sredstva regulirovaniya dorozhnogo dvizhenia", 1981, Transport Publishers (Moscow), p. 77–81) comprising a convex paraboloidal reflector (collimator) with a light source at its focal point and an absorber of external illumination made in the form of black plates disposed in the meridian planes of the collimator ("antiphantom cross"). These plates have slots, which cannot be eliminated since a light source is located in these slots. External illumination rays pass through these slots near the collimator focal point and, having been reflected by the paraboloidal mirror, are radiated along the collimator axis together with the useful rays of the device. Thus, while eliminating lateral flashes, this device is practically unprotected against external illumination in the most important information-values directions close to the axis of the light signalling device.

SUMMARY OF THE INVENTION

The present invention is to provide a light signalling device, in which a reflector and an absorber of light rays would be made and mutually arranged so that they completely eliminate flashes from sources of external illumination in the direction of observation at any disposition of these sources.

This is attained by a light signalling device comprising a collimator with a reflector, a light source disposed at the focal point of the collimator, and an absorber of light rays. According to the invention, at least a portion of the absorber surface is arranged at an angle to the focal rays of the collimator, in which case the reflector and absorber are disposed so that any focal ray extending oppositely to the focal ray incident on the reflector is guided to the absorber.

The claimed design of the light signalling device allows one to eliminate the phantom effect and suppress the flashes of external illumination in the axial direction of radiation irrespective of the direction of external rays. This is achieved due to the fact that in the claimed device only useful radiation can pass in the direction of the focal ray incident on the reflector (and after it has been reflected, extending along the collimator axis) since only the light source of the device is situated on the optical geometric line of this radiation, while the absorber lie on the way/of propagation of the external light rays.

According to one embodiment of the invention, the reflector is made in the form of a concave mirror, which together with the absorber form a surface encompassing the light source at the side opposite to the light aperture of the device.

This embodiment is rather simple because when the absorber and reflector are made in the form of a common surface encompassing the light source, it is possible to combine them with the internal surface of the device body.

In another embodiment of the invention the concave mirror is limited by the light aperture of the device, as well as by the plane, which intersects the collimator axis in front of its focal point and at an arbitrary angle so that at least a part of the mirror adjoining the plane has a parabolic shape co-focal with the collimator, while the plane is spaced at a distance from the focal point determined by the formula $$v \geq g \sin \xi$$

where
  V is the distance between the focal point and the plane;
  g is the maximum distance between the focal point and the line separating the mirror surface from the absorber surface; and
  $\xi$ is the useful scattering angle of the device.

In this embodiment, the phantom effect can be eliminated in the axial direction and in any arbitrarily preset range of observation of the signals, e.g. that coinciding with the useful scattering angle of the device. This is attained due to the fact that for an arbitrary point of the reflector the respective portion of the absorber has sufficiently large angular dimensions (determined by the distance between the cutting plane and the focal point).

In the preferred embodiment of the invention the plane intersects the light aperture of the device, in which case the front part of the absorber is bent from the reflecting surface of the mirror and covers the inner surface of the absorber on the light aperture side.

The device in this embodiment provided various design solutions when arranging a signal lamp on a streamlined body of a vehicle. The device is convenient for combining a signalling unit (e.g. a direction indicator) with other light units (e.g. head-lamps), since such an arrangement provides compactness of the light unit.

An embodiment is possible, in which the mirror is made of parts separated by light absorbing elements, the surface of said elements being limited by the light aperture of the device and by the meridian planes.

In this embodiment the device has a shaped information-valued light aperture and can be used in special-purpose light indicators.

It is expedient that the reflector should be made in the form of a concave mirror disposed on the focal plane of the collimator, while the absorber should be made of two separate parts: an external part having a form of a truncated conical surface adjoining the front edge of the reflector and widening towards the light aperture of the device at an angle not overcoming the useful scattering angle and an internal part made as a barrel encompassing the light source on the light aperture side of the device.

In this embodiment the device is equiped with a reflector having an included angle of up to 180° providing a minimum axial size with maximum utilization of the luminuous flux of the source of an antiphantom light signalling device.

The output aperture of the collimator may be shielded by a protective glass (light filter) whose surface is formed by rotating a branch of a parabola about the device axis the parabola axis extending along the generatrix of the conical part of the absorber, while the focal point and pole of the parabola lying respectively on the front and rear edges of the absorber.

Such an embodiment provides complete elimination of the phantom effect and the best contrast of the light signals in a strictly defined range of directions of observation, since in this range the flashes of external illumination are removed both from the reflector and the protective glass. This embodiment is preferably used in a long-range traffic lights.

In another embodiment of the invention the reflector is made of a transparent material in the form of a total internal reflection surface, in which case the absorbing surface encompasses the light source and the reflecting surface on the side opposite to the light aperture of the device.

In this embodiment the reflector also performs functions of a light filter since it may be made of a material having a signal colour. In addition, the technological operation of applying a mirror coating onto the reflector is eliminated.

The reflector can be made in the form of catadioptric rings, each of which is a trihedral prism including an input refracting face, a face of total internal reflection of focal rays, and an output refracting face, in which case these rings are located in front of the focal plane of the collimator and is shaped so that the optical-geometric beam connecting two diametrally opposite points of the reflecting surface of the same ring and intersects it at an angle less than the total internal reflection angle.

In this embodiment the external illumination flashes are suppressed not only in the axial direction of observation but also in the lateral direction so that the reflector surface in these directions illuminates the black housing of the device. This makes it possible to use such a scheme in light signalling devices with a wide range of angles of observation, e.g. in long-range and short-range traffic lights.

In accordance with one embodiment of the invention, the catadioptric rings are made on the paraboloidal carrier layer, in which case the reflection surface of each ring forms an angle $v$ with its input and output faces, said angle being calculated by the formulas:

$$v = \text{arc } tg \frac{1 - \cos\lambda}{\sqrt{n^2 - 1} - \sin\lambda},$$

$$\lambda = 45° - \text{arc } tg \frac{1 - \sin\rho}{2 - \cos\rho},$$

wherein $\rho$ is the angle between the collimator axis and the focal ray incident on this ring.

In this embodiment the catadioptric rings forming the reflector are made on a common carrier layer and this allows the reflector to be made as an integrally pressed component thus improving the technological features of the device.

It is expedient that the collimator includes an annular collecting lens arranged in front of the focal plane; the axis of circular symmetry of this lens extends along the collimator axis; the optical axis of its profile passes through the common focal point of the collimator and this lens at an acute angle to the collimator axis; the output aperture of the lens is matched with the input aperture of the reflector whose catadioptric rings are made on the conical carrier layer expanding towards the output aperture of the collimator and having a blind hole whose diameter is at least equal to the maximum diameter of the annular lens, while the angle $v$ between the reflecting surface and the input faces of the catadioptric rings is selected using the formula:

$$tg \, v = \frac{1 - \cos(\rho - \psi)}{\sqrt{n^2 - 1} - \sin(\rho - \psi)}$$

where
  $\psi$ is the angle of taper of the reflecting surface;
  $\rho$ is the angle between the collimator axis and the optical axis of the annular lens;
  $\nu$ is the refraction index of the reflector material.

In this embodiment the catadioptric rings have identical profiles and this simplifies designing and calculation of the optical system of the device, and also facilitates manufacture of a press mould for making the integrally pressed reflector.

According to another embodiment of the invention, at the output aperture side of the device the blind hole is overlapped by a disk-shaped collecting lens, in which the connecting faces of the Fresnel rings are parallel to the collimator axis.

The additional lens in the collimator, which overlaps the blind hole of the reflector, provides uniform distribution of brightness over the output aperture of the device, since the dark spot in the aperture center is eliminated and the device efficiency is increased. The flashes from the connecting faces of the Fresnel rings of the lens are eliminated at least in the axial directions.

The collimator components made of a transparent material may include meridian slots filled with black dyestuff.

Additional light absorbing elements disposed in the meridian planes assist in total elimination of the flashes in the lateral directions since all "outmeridian" rays are absorbed. The use of such light absorbing elements in the form of slots simplifies the construction since these light absorbing elements can be made as an integral part of the device.

Furthermore, it is expedient that the angle of taper of the reflecting surface of the reflector is half the angle between the collimator axis and the optical axis of the annular lens profile and is twice the angle between the reflecting surface and the refracting faces of the catadioptric rings.

In this case the conical catadioptric reflector requires minimum materials for its manufacture due to a constant thickness of the carrier layer and provides relatively high efficiency due to utilization of Fresnel reflection of the light from the output faces of the catadioptric rings.

In still another embodiment of the invention the output faces of the catadioptric rings of the reflector are parallel to the optical axis of the profile of the annular lens, the thickness of the carrier layer of the reflector and the width of the refracting faces of the catadioptric rings decrease towards the output aperture of the collimator.

In this embodiment the maximum utilization of the luminous flux of the light source is obtained due to elimination of light losses between the input faces of the catadioptric rings of the device, i.e. maximum efficiency of the device with a catadioptric conical reflector is obtained.

BRIEF DESCRIPTION OF THE DRAWINGS

Other objects and inherent advantages of the present invention will be apparent from the following detailed description thereof and appended drawings in which:

FIGS. 4 and 5 show a schematic diagram of a light indicator (an axial section and a plan view respectively) having an information-valued shape of the light aperture;

FIG. 6 shows a signal projector with a strictly defined range of directions of observations free of external illumination flashes;

DESCRIPTION OF THE PREFERRED EMBODIMENTS

Figure 1:
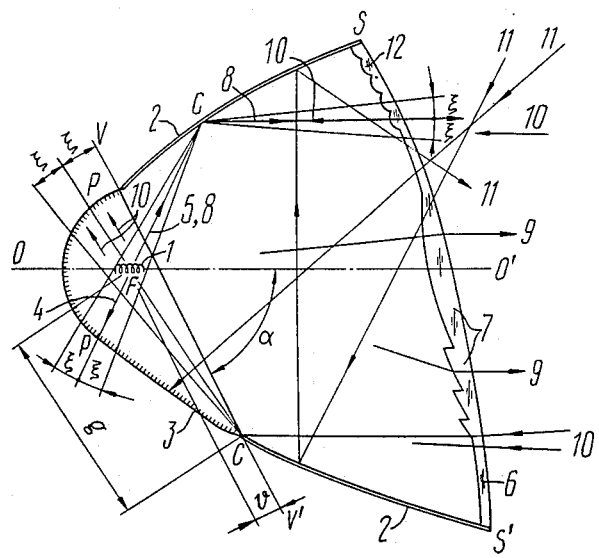
FIG. 1 shows a schematic diagram of the device with a mirror reflector to illustrate the basis principles of operation of the device and its layout.

The light signalling device (FIG. 1) comprises a light source 1 (a filament of an electric lamp) located at a focal point F of a collimator with an axis OO' (also referred to as axis of the device) made in the form of a reflector 2, and an absorber 3 to absorb light rays. The absorber 3 is made in the form of a black light-absorbing surface arranged at an angle to the focal rays (rays originating from the focal point F) and has such shape and size that any focal ray 4 extending in opposition to a focal ray 5 falling onto the working surface of the reflector 2 is incident on the surface of the absorber 3. In other words, for each point C of the reflector 2 on the surface of the absorber 3 there is a respective point P, such that the rays FC and FP pass in opposite direction (we cannot say that the line CP is always straight since in the presence of optically active bodies, e.g. a lens between the light source 1 and the reflector 2, like in FIG. 8, the rays can change their direction).

In the embodiment shown in FIG. 1 this condition is fulfilled due to the fact that the reflector 2 and the absorber 3 form a single surface over the inner face of the body encompassing the light source 1 at the side opposite to the light aperture SS' of the device, in which case the whole reflecting surface made as a part of a mirror paraboloid of revolution about the axis OO' with a focal point F is limited by the light aperture SS' of the device (output aperture of the collimator) and through cutting the paraboloid by a plane VV', which intersects the collimator axis OO' in front of its focal point F at an arbitrary angle $\alpha(0<\alpha\leq 90°)$, e.g. $\alpha=60°$. The light aperture SS' is closed by a protective glass 6 also serving as a light filter, the central part of which may be made in the form of a collecting lens 7 closing the collimator blind hole formed by cutting off the top of the paraboloid mirror 2 by the plane VV'.

The device operates as follows. The light rays 8 emitted by the source 1 and falling onto the reflector 2 are reflected and radiated through the light aperture SS' (while being coloured in a required colour when passing through the light filter 6) along the collimator axis OO' (information-valued direction) as a useful light signal. A part of the luminous flux of the signal is formed by the rays 9 of the source 1, which are refracted by the lens 7. Thus the dark spot in the center of the light aperture SS' is eliminated. The external illumination rays 10 (e.g. from automobile head-lamps) falling on the reflector along the axis OO' are reflected thereby according to the law of optics towards the focal point F and are absorbed either by the light source 1 (lamp filament) or by the portion of the absorber 3 located behind the source against the point of reflection of the ray 10. The external illumination rays 11 falling on the reflector 2 at an angle to the axis OO' (e.g. light from the sun or sky) are either also reflected onto the absorber 3 or repeatedly reflected inside the device and come out through the light aperture SS' at an angle to the axis OO' of radiation (and observation) of the signals. The proof that no external illumination flashes originate from the reflector 2 in the direction along the device axis may be obtained on the basis of the following reasonings. Assume that a ray 11 from an external source, after an arbitrary number of reflections, comes out from a certain point C of the reflector 2 not at an angle to the axis OO', but in parallel to this axis; then the opposite ray, after having been subjected to the same number of reflections in a reverse order, comes out through the light aperture SS' (to the external source of the ray 11). However, this is impossible since any ray falling on the point C of the reflector 2 and parallel in the axis OO' is reflected towards the focal point F and is absorbed at the respective point P of the absorber 3. Thus, the main direction of observation of the signals of the device along the axis OO' of its radiation is protected from external illumination flashes, and it does not matter at what angle the external sources illuminate the reflector 2. Flashes can be observed only at angular deviation of the line of observation of the signals from the axis OO'. If the angular deviation is small, the flashes come from those zones of the reflector 2, which adjoin its blind hole 6. The collecting lens 7 deflects a significant fraction of flashes from the axis OO'. However, the probability of origination of flashes from the lens itself rises with an increase in its focal power.

In many light signalling devices the information-valued direction lies not only along the axis OO' but also within a certain range of angles to the radiation axis. It might be considered equal to the useful scattering angle $\xi$ of the device. The false signals produced by the illumination within the whole range of angles $\xi$ can be eliminated by increasing the included angle of the absorbing surface 3 with a corresponding decrease of the reflecting surface so that the part of the absorber 3 including the point P and situated against the arbitrary point C of the reflector 2 (including the space at the blind hole edge) has finite (but sufficiently large with respect to the point C) angular dimensions, not less than $\xi$ in different directions from the line CP. To this end, in the device shown in FIG. 1 the cutting plane VV' passes near the focal point F at a distance determined by the formula $$v \geq g \sin \xi, \quad (1)$$

where g is the distance from the focal point F to the most removed point of the curve separating the reflecting surface from the absorbing one.

The needed widening of the angle of scattering the useful radiation (to the value $\xi$) for an ideal paraboloid is provided either by the finite size of the lamp filament I' or by reducing the optical power of the lens 7 or by introducing light scattering elements 12 on the protective glass 6 or on the reflector 2 itself. In the latter case the value v may be increased to a maximum value $v' = g \sin(\xi - \xi')$, where $\xi'$ is the scattering angle provided by the elements 12 depending on their disposition. The scattering within the angle $\xi$ can also be obtained by withdrawing the surface of the mirror 2 from the exact paraboloid, for which purpose its meridian profile must include portions deviating from a parabola co-focal with the device for an angular value in the order of $\xi/2$. If the parabola profile is disturbed near the plane VV', the parameter v may be higher or lower, its value satisfying the formula (1).

Taking into account the required scattering angle, the operation of the device acquires the following features. The rays 8 and 9 emitted by the source 1 are radiated by the collimator within the useful scattering angle $\xi$ along the axis OO'. The rays 10 of external illumination falling onto an arbitrary point within the angle $\xi$ are absorbed in the vicinity of the corresponding point P of the absorber 3. The rays 11 from the external sources propagating relative to the axis OO' at an angle larger than the angle $\xi$, having been repeatedly reflected, can not be incident on the absorber 3 but their flashes extend at an angle exceeding the angle $\xi$. Thus, for any preset range of information-valued directions the optical system of the device can suppress flashes of external illumination in these directions, no matter how the external illumination sources are displaced with respect to the axis OO' of the instrument.

Figures 2, 3:
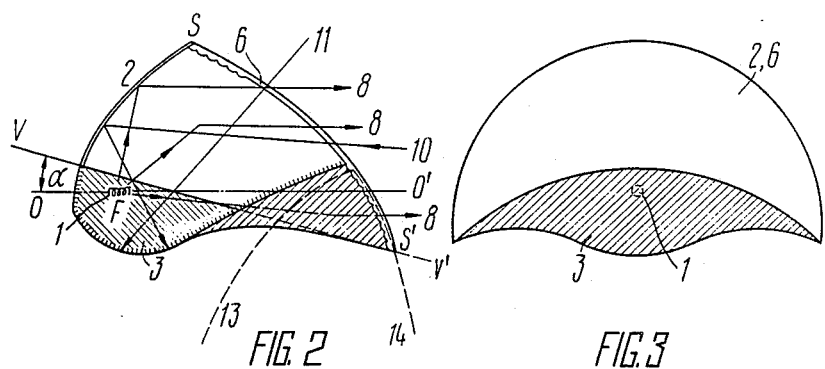
FIGS. 2 and 3 show a schematic diagram of a vehicle light (an axial section and a plan view respectively) having a streamlined body.

The angle $\alpha$ between the axis OO' and the cutting plane VV' may be as small as possible (or even equal to zero), the location of the light aperture SS' and the shape of the protective glass 6 can also be different so that the plane VV' can be intersected by the surface of the light aperture SS' of the device and this aperture can be contigous partly to the reflector 2 and partly to the absorber 3. This embodiment in an axial section and in a front view is shown in FIGS. 2 and 3 respectively. In this case the blind hole in the reflector 2 (i.e. the inner part of the absorber 3 seen along the axis OO') is preferably closed not by a lens but by the front portion of the absorber 3, which is concave from the reflecting surface, and this makes it possible to reduce the size of the signal unit, while the light aperture SS' can be made in an original falcate from. A different tilt of the cutting plane VV' at different inclinations and shape of the light aperture SS' provide wide facilities of when designing streamlined signal lamps to be secured on components of the vehicle body having a complex shape. In particular, the scheme shown in FIGS. 2, 3 is useful when designing a front turn lamp combined with a head-lamp of a motor vehicle, the edge 13 of the reflector 13 of which can enter the concave space of the cresent-shaped light aperture of the turn signal lamp and which can have a common line of the light scattering element 14 therewith.

The collimator may consist of individual isolated mirrors and have a complex-shape light aperture, i.e., the isolated zones of the reflector 2 may be limited by meridian planes. FIGS. 4, 5 show the light signalling device in a cross section and a front view respectively. In this device the reflector 2 consists of three zones of a mirror paraboloid separated from each other by three meridian planes 15 intersecting along the axis OO' at angles multiple of 60°. The gaps between the zones of the reflector 2 and between the zones of the light aperture SS' disposed normal to the axis OO' opposite to the zones of the reflector 2 and covered by parts of the light filters. These parts are made in the form of light absorbing zones 3 forming with the zones of the reflector 2 a surface encompassing the light source 1 on the side opposite to the light aperture.

The rays 8 of the light source 1 fall onto the reflector 2 and are radiated through the light aperture SS'. The external illumination rays penetrating into the device either fall directly on the absorber 3 or on the same absorber, after having been reflected from the mirror zones 2. The light aperture (FIG. 5) has a specific form of the "Radiation Danger" sign, which determines a possible field of application of the above described light signalling device. Other information-valued shapes of the light aperture typical for various light indicators, are possible, e.g. pedestrain traffic lights, in which case the disposition and form of reflecting and light absorbing zones inside the device must be matched with the shape of the light aperture SS'.

FIG. 6 shows a signal head-light with a strictly defined scattering angle $\pm \xi$. The filament 1 of an electric lamp 16 is located at the focal point F of a facet reflector 2 consisting substantially of flat mirrors having an angular size $\xi$ with respect to the point F on a parabolic frame. The focal plane passes in front of the reflector 2. The included angle of the reflector 2 cap be brought to 180° if in the meridian plane the peripheral mirrors 17 have a shape of a parabola 18 whose focal point B lies on the aperture boundary of the reflector 2, while the axis BB' extends at an angle $\xi$ to the axis OO' of the device intersecting this axis in front of the light aperture SS'. The absorber 3 consists of a truncated cone 19 having a height $H \geq D/4$ and an angle of taper equal to $\xi$. The lower dimeter of this truncated cone adjoins the edge of the reflector 2. The absorber 3 also includes an absorbing cup 20 encompassing the light source with an included angle of 180°. The diameter d of the cup is selected provided that the straight line AC, extending through the front edge of the cone 19 and the rear edge of the cup, intersects the mirror 2 at an angle $\geq \xi$ to the line connecting the intersection point C and the focal point F. In particular, a value is permissible which is found from the equations $$d = \frac{D \sin(\xi + 2\xi')}{[1 + \cos(\rho - \xi')]\cos\rho}, \quad (2)$$

$$\rho = \arctan\left(\frac{D-d}{2H} + \tan\xi\right)$$

where $\xi' \leq \xi/2$ is the angular deviation of the reflector 2 from the paraboloid accepted as a permissible value in the vicinity of the point C.

The embodiment of a projector satisfying the equations (2) and intended for use in road traffic lights may have parameters $\xi \approx 10°$, $\xi \approx 0$ (in the vicinity of the point C the mirror is strictly parabolic); $H = D/3$, $d = D/5$. The protective glass $\sigma$ also performing the function of a light filter has a shape of a surface of revolution (about the axis OO' of the device) of one of the branches of a parabola 21 whose axis AB passes along the generatrix of the cone 19 (at an angle $\xi$ to the axis OO'), while the focal point A and the pole B are located on its front and rear edges respectively. The glass 6 does not protrude beyond the front edge of the absorber 3 as a part of the body, provided that $$H \geq \frac{D}{2} \cdot \frac{\cos\xi(1 + \sin\xi)}{2 - \sin\xi(1 + \sin\xi)} \quad (3)$$

and this improves the mechanical properties of the device. The glass 6 may have a simple conical shape. However, this would result in large axial dimensions of the device and in Fresnel loss of useful radiation.

The device shown in FIG. 6 operates as follows. The rays 8 of a light source 1 falling on the reflector 2 are radiated in information-valued directions. The facet reflector 2 provides uniform illumination over the surface of the light aperture in any direction within a range of $\pm \xi$. The external illumination rays 10 forming with the axis OO' an angle lower than $\xi$ are reflected by the mirror 2 to the surface of the absorber 3 in accordance with the design of the device; the external rays 11 forming with the axis OO' an angle larger than $\xi$ are either reflected at any angle to the axis OO' exceeding the value $\xi$ (i.e. beyond the range of information-valued directions or are also absorbed inside the device). Proof by contradiction: assume that a flash from an external source after an arbitrary number of reflections comes out from a certain point of the mirror at an angle to the axis OO' lower than $\xi$. Then by the principle of reversibility of optical-geometric rays the return ray would also come out from the device (to the external source) but this is in contradiction with the construction of the device (the return ray will fall into the absorber). Fresnel flashes from the protection glass 6 (FIG. 6) are also possible only in directions forming with the axis OO' an angle larger than $\xi$, since the directions 22 reflected by the glass 6 in the information-valued directions are closed by the absorber 19.

The device shown in FIG. 6 features a relatively small axial size but provides maximum (for "anti-phantom" device) efficiency (up to 50%) and eliminates the phantom effect in a strictly defined range of information-valued directions. This device is used mostly in medium- and long-range traffic lights.

The collimator, which in the described embodiments (FIGS. 1 to 6) is a mirror reflector 2, i.e. made by applying an opaque metallic coating on an optically smooth surface, may be made in the form of a catadioptric reflector, i.e. made of a transparent material of an arbitrary colour in the form of prismatic element featuring total internal reflection. Such a design makes the mirror coating unnecessary and provides an additional function of a light filter (by making it from a material having a signal colour). Furthermore, the catadioptric reflector makes it possible to reduce the brightness of external illumination at large angles to the device axis. This is possible due to the fact that the total internal reflection, in contrast to the mirror one, takes place only in a limited range of angles, and the rays falling on the reflecting surface at an angle lower than the maximum one come through this surface without any reflection and can be absorbed by an additional absorber located behind the catadioptric reflector.

Figure 7:
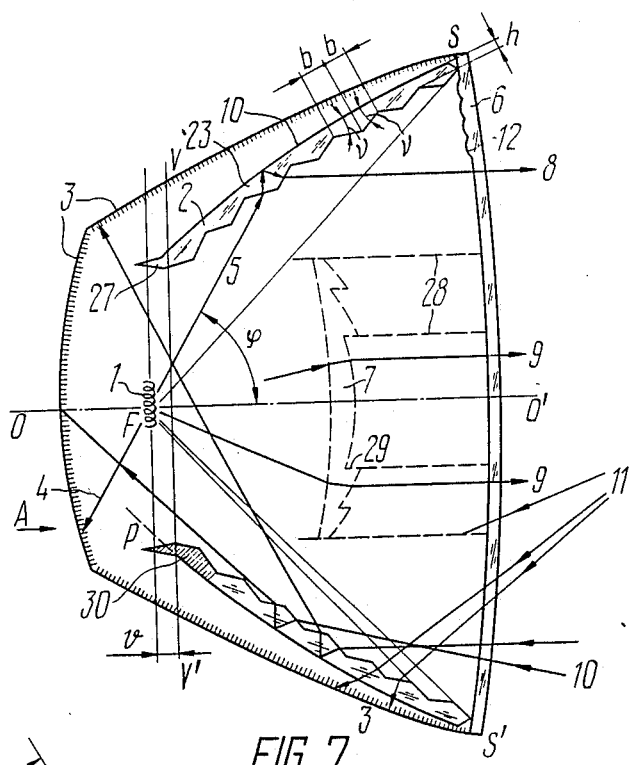
FIG. 7 shows a schematic diagram of the device with a parabolic catadioptric reflector.

The device shown in FIG. 7 consists of a light source 1 disposed at a focal point F on the device axis OO', a catadioptric reflector 2 providing total internal reflection of focal rays to an optical light aperture SS' and an absorber 3 of optical rays made on the inner surface of the device body and encompassing both the source 1 and the reflector 2 at the side opposite to output aperture SS'. The reflector 2 consists of catadioptric rings 23 located symmetrically around the axis OO' and made on a common carrier layer expanding towards the light aperture SS'. Each ring 23 is shaped as a three-face prism (FIG. 8) having an input refracting face 24, a total internal reflection face 25 and an output refracting face 26. The faces 24, 26 are on the internal surface of the carrier layer while the faces 25 are made on the external surface of this layer. On the side of the narrow (working) part of the reflector 2 there is provided a blind hole whose plane VV' passes in the focal plane of the collimator or in front of this plane at a distance v therefrom. Thus the entire reflecting surface of the collimator is located in front of its focal plane.

Figure 8:
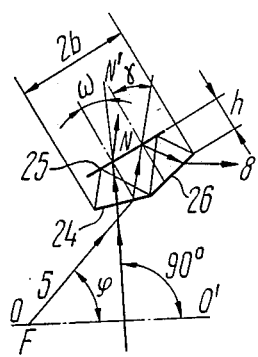
FIG. 8 is a schematic diagram explaining the path of rays in the catadioptric reflector.

The profile of each ring 23 satisfies the condition clarified in FIG. 8: the normal NN' to the face 25 of the ring 23 must make an angle $\gamma$ not lower than the critical angle of the total internal reflection with the focal ray 5 (i.e. with the ray of the source 1 after it has been refracted by the face 24) and an angle $\omega$ smaller than critical angle with the ray connecting two diametrally opposite points of the reflecting surface of the ring 23 (also taking into account the change of direction on the refracting faces), i.e.

$$\omega < \arcsin \frac{1}{n} \leq \gamma \qquad (4)$$

where n is the refractive index of the material of the catadioptric ring 23.

For the rings 23 close to the blind hole plane with $v \rightarrow 0$ $\omega \rightarrow \gamma$, i.e. at least the reflecting zones 2 close to the focal plane must be intended for operation at the critical angle of total internal reflection.

Fulfilling the condition (4) eliminates, at least for the meridian rays, a possibility of double reflection from the reflector 2, while single reflection of external illumination rays makes them to be incident on the absorber 3 in the blind hole zone or in the zone encompassing the reflector 2. The catadioptric reflector 2 of the device shown in FIG. 7 is made on a parabolic carrier layer with a top cut off by the plane VV', said layer being coaxial and co-focal with the collimator. The refracting faces 24 and 26 form with the parabolic reflecting surface an identical angle), which may be selected in accordance with (4) in rather a wide range for the rings 23 removed from the focal plane. The minimum value of this angle is $$v = \arctan \frac{1 - \cos\rho/2}{\sqrt{n^2 - 1} - \sin\rho/2} \qquad (5)$$

where $\rho$ is the angle between the focal ray incident on the catadioptric ring and the axis 00', which corresponds to the critical angle of total internal reflection for all focal rays, which means that the value $v$ is the best from the point of view of suppressing external illumination but is associated with significant losses of useful radiation between the adjacent input faces. An optimum version is provided when $$v = \text{arc } tg \frac{1 - \cos\lambda}{\sqrt{n^2 - 1} - \sin\lambda}, \qquad (6)$$

$$\left(\lambda = 45° - \text{arc } tg \frac{1 - \sin\rho}{2 - \cos\rho}\right)$$

and the ray passing near the rear edge of the reflector 2 are reflected at a definite angle or, more correctly, the rays passing through the point P of intersection of the parabola of the reflector 2 with its focal plane. In this case no rays coming from the opposite side of the reflector 2 are subject to total internal reflection.

The width of the faces 24, 26 of various catadioptric rings 23 with a constant thickness of the carrier layer of the reflector 2 is different (this is necessary for matching the apertures of the faces 24, 25 and 26) and is calculated by the formulas:

$$b = \frac{2tg\gamma}{1 - tg\gamma tgv} \cdot h \qquad (7)$$

$$\gamma = v + \arcsin \frac{\cos(\rho/2 + v)}{n} \qquad (8)$$

where
b is the thickness of the catadioptric ring;
h is the thickness of the carrier layer of the reflector;

In order to eliminate the flashes from the inoperative rear end part of the carrier layer of the reflector 2, the profile of this end part is made in the form of a sharp-angle wedge 27 whose faces form an angle of 25° or less with the axis 00'.

The collimator in this device may include a collecting lens 7 closing the blind hole of the reflector 2 deepened into the reflector. A cylindrical absorber 28 mounted coaxially with the collimator in front of the lens 7 (there may be several absorbers built one into another) without overlapping the useful rays of the collimator suppresses the flashes from the wide-range Fresnel lens 7. In the presence of the Fresnel rings of the lens 7 on the front part of the carrier layer the connecting faces 29 of these rings must be parallel to the axis 00'. Such a design of the lens 7 eliminates the flashes from the connecting faces 29 at least in the axial direction.

The output aperture of the collimator is overlapped by a protective glass 6, which may be colourless if the reflector 2 and the lens 7 are made of a material having a signal colour. The glass 6 may have scattering elements.

The device shown in FIG. 7 operates as follows. The rays 5 of the light source 1 incident on the input faces 24 of the catadioptric rings 23 are refracted and fall on the face 25 at an angle $\gamma$ satisfying the expression (4), totally reflected and, having been reflected on the output face 26, are radiated in the form of rays 8 through the glass 6 along the axis 00'. A smaller fraction of the luminous flux of the collimator consists of rays 9 of the source refracted by the lens 7. The rays 10 of external illumination constituting a sharp angle with the axis 00' reflecting from the reflector 2 or being refracted by the lens 7 are fed through the blind hole of the reflector 2 onto the central part of the absorber 3. The rays 11 of external illumination intersecting the axis 00' at a great angle are subjected to a single reflection, penetrate through the reflecting surface (faces 25) in virtue of the condition (4) and are absorbed by the zone of the absorber 3 encompassing the reflector 2. In the presence of a cylindrical absorber 28 a fraction of the rays 11 is absorbed thereby.

Figure 9:
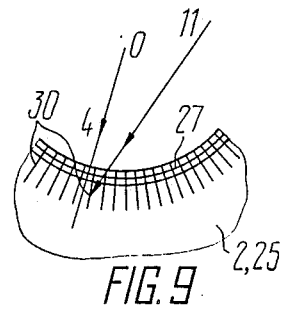
FIG. 9 shows a version of the meridian absorbing elements made in the form of black slots in the body of the catadioptric reflector.

If the external ray 11 does not lie in the meridian plane, depending on the degree of deviation from this plane as well as on the value of the angle $\gamma$ at the point of incidence of the ray onto the reflector 2 and the curvature of the catadioptric ring 23, this ray can be refracted more than once and comes out through the light aperture SS' at an angle to the axis 00' of radiation. Such rays are usually suppressed by the meridian absorbing plates. Instead of plates, as individual elements of the device, the system of a catadioptric reflector 2 (and other collimator elements made from a transparent material, where the focal ray does not pass from the plane of the axis 00') there can be provided meridian slots 30 filled with black dyestuff, as it is shown in FIG. 9 illustrating the reflector 2 of the device of FIG. 7 at the blind hole side. The dyestuff must be in optical contact with the material of the reflector 2, i.e. exclude the total internal reflection from the internal surface of the slot (otherwise this slot becomes harmful and not useful).

The effect of the meridian rays of external illumination on the signal contrast is very low if $\gamma \rightarrow \text{arc sin } 1/n$ for all catadioptric rings 23 of the reflector 2.

Figure 10:
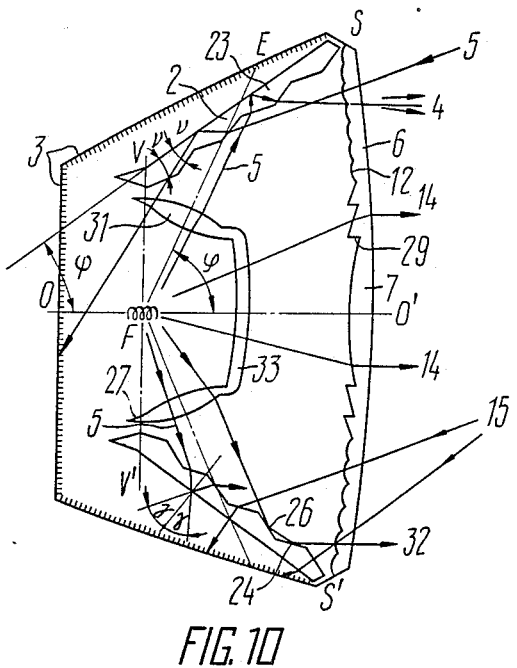
FIG. 10 shows a schematic diagram of a signal light having an annular lens and a conical catadioptric reflector.
Figure 11:
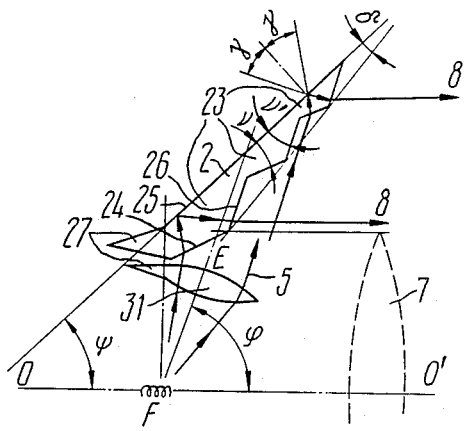
FIG. 11 shows a schematic diagram of a collimator featuring a catadioptric reflector having a carrier layer of varying thickness.

In the collimators shown in FIGS. 10, 11 the reflector 2 is shaped as a truncated cone with an angle of taper equal to $\psi$ and is supplemented with an annular collecting lens 31 located in front of the focal plane and having a diameter not exceeding the diameter of the blind hole in the reflector 2 (narrow part of the cone). The axis FE of the profile of the lens 31 passes through the common focal point F of the collimator and this lens at an angle $\rho$ to the collimator axis 00', which does not exceeds 90°, and intersects the reflector 2. Passing in parallel to this axis are all rays 5 originating from the point F and refracted by the lens 31 so that the catadioptric rings 23 of the reflector 2 may have the same (FIG. 10) or a similar (FIG. 11) profile satisfying the right-hand limit of the formula (4) through the relation $$tg\nu = \frac{1 - \cos(\rho - \psi)}{\sqrt{n^2 - 1} - \sin(\rho - \psi)}, \quad (9)$$

where
- $\nu$ is the angle between the input face and reflecting edge of each ring;
- n is the refractive index of the material of the reflector 2.

The reflector of the collimator shown in FIG. 10 has a constant thickness h of the carrier layer, $\rho = 2\psi$, the case, when $$\psi = 2\nu = \arcsin \frac{\sqrt{n^2 - 1}}{2} \quad (10)$$

being of special interest the loss of rays 32 of the source 1 falling directly on the output face 26 is partially compensated by their Fresnel reflection at a large angle from the faces 26 and 24 in the direction of the axis 00' of the collimator. In particular, for n=1.5, $\psi=24°$.

In the collimator shown in FIG. 11 the carrier layer has a varying thickness to eliminate the luminous flux losses between the adjacent catadioptric rings 23—the faces 26 are parallel to the axis of the profile of the lens 31, in which case $$\psi = \arcsin \frac{\cos\rho}{n} - \arcsin \frac{1}{n} + \rho \quad (11)$$

The particular embodiment of the collimator in FIG. 11 has the following parameters: n=1.5; $\rho=70°$; $\psi=41.4°$; $\nu=10.8°$; $\nu'=28.6°$ ($\nu$ and $\nu'$ are the angles formed by the face 25 with the faces 24 and 26 respectively); the angle between the reflecting surface and the tanget to the front surface of the reflector 2 (the wedge-shaped carrier layer) is equal to $\delta=8.5°$.

The blind hole of the conical reflector 2 whose edge actually extends along the internal edge of the output face 26 of the catadioptric ring 23, which is the first from the focal plane (FIG. 11), may be overlapped by an additional absorber or by a collecting lens 7. The lens 7 may be combined with a colourless scattering element 6 with a colourless reflector 2, while a required colour of the signal is obtained by using a light filter 32 in the form of a cap mounted in front of the light source 1. In the device shown in FIG. 10 the ring lens 31 is combined with the lateral surface of the light filter 32.

The use of the conical lens 31 with the reflector 2 simplifies the manufacture of the press mould for making the reflector 2 and makes it possible to increase the efficiency of the light source 1 with limited axial dimensions of the device.

The system shown in FIG. 7 is intended primarily for medium- and short-range traffic lights; the systems shown in FIGS. 10 and 11 can be used in vehicle signal lights.

In order to exclude the axial phantom effect from the glass bulb of an electric light source, the size of the bulb in any collimator should be as large as possible and the bulb shape should never be spherical (with a heater filament in the centre of the sphere). The normal NN' to the surface of the glass bulb erected at the points of its intersection with the focal rays incident on the most effective zones of the reflector must pass at a maximum angle $\mu$ (FIG. 6) to these rays known to be larger than the value $\xi/2$, where $\xi$ is the useful scattering angle of the device.

The present invention can be effectively used in directional light signalling devices subject to external illumination (sunlight, skylight etc.), e.g. in vehicle signal lights, in particular, in turn and stop signals, as well in road and railway traffic signal lights.

What is claimed:

1. A light signalling device comprising a collimator with a reflector (2), a light source (1) disposed at the focal point (F) of the collimator, and an absorber (3) of light rays, characterized in that at least a portion of the surface of the absorber (3) is arranged at an angle to the focal rays of the collimator, the reflector (2) and the absorber (3) being mutually positioned so that any focal ray (4) directed in opposition to a focal ray (5) incident on the reflector (2) falls onto the absorber (3), said reflector (2) being made of a transparent material configurated in the form of a total internal reflection surface, the surface of the absorber (3) encompassing the light source (1) and the reflecting surface on the side opposite to a light aperture (SS') of the device.

2. A light signalling device as claimed in claim 1, characterized in that the reflector (2) is made in the form of catadioptric rings (23), each of which has a profile of a trihedral prism including an input refracting face (24), a face (25) of total internal reflection of focal rays, and an output refraction face (26), in which case the rings (23) are located in front of the focal plane of the collimator and have such a profile that the optico-geometrical beam connecting two diametrally opposite points of the reflecting surface of each ring (23) intersects it at an angle ($\omega$) less than the total internal reflection angle.

3. A light signalling device as claimed in claim 2, characterized in that the catadioptric rings (23) are made on a paraboloidal carrier layer, in which case the reflection surface of each ring (23) forms an angle ($\nu$) with its input face (24) and output face (26), said angle being calculated according to the formulas:

$$\nu = \text{arc } tg \frac{1 - \cos\lambda}{\sqrt{n^2 - 1} \sin\lambda},$$

$$\lambda = 45° - \text{arc } tg \frac{1 \sin\rho}{2 \cos\rho},$$

wherein $\rho$ is the angle between the collimator axis and the focal ray (5) falling on this ring (23).

4. A light signalling device as claimed in claim 2, characterized in that the collimator includes an annular collecting lens (31) arranged in front of the focal plane and having an axis of circular symmetry extending along a collimator axis (00'), said lens having a profile defining an optical axis (FE) extending through a common focal point (F) of the collimator and said lens (31) at an acute angle ($\rho$) to the collimator axis (00'), said lens (31) having an output aperture matched with the input aperture of the reflector (2) whose catadioptric rings

(23) are made on the conical carrier layer expanding towards the output aperture (SS') of the collimator and having a blind hole whose diameter is not less than the maximum diameter of the annular lens (31), while the angle ($\nu$) between the reflecting surface and the input faces (24) of the catadioptric rings (23) is selected using the formula:

$$tg\nu = \frac{1 - \cos(\rho - \psi)}{\sqrt{n^2 - 1} - \sin(\rho - \psi)}$$

where
$\psi$ is the angle of taper of the reflecting surface;
$\rho$ is the angle between the collimator axis (00') and the optical axis (FE) of the profile of the annular lens (31); and
n is the index of refraction of the material of the reflector (2).

5. A light signalling device as claimed in claim 4, characterized in that the angle ($\psi$) of taper of the reflecting surface of the reflector (2) is half the angle ($\rho$) between the collimator axis (00') and the optical axis (FE) of the profile of the annular lens (31) and is twice the angle ($\nu$) between the reflecting surface and the refracting faces (26) of the catadioptric rings (23).

6. A light signalling device as claimed in claim 4, characterized in that the output faces (26) of the catadioptric rings (23) of the reflector (2) are parallel to the optical axis (FE) of the profile of the annular lens (31); the thickness of the carrier layer of the reflector (2) and the width of the refracting faces (24, 25) of the catadioptric rings (23) decrease towards the output aperture of the collimator.

7. A light signalling device comprising a collimator and a light source (1) disposed at the focal point (F) of the collimator, the collimator comprising a reflector (2) made of a transparent material, having a rear surface for total internal reflection of focal rays and including catadioptric rings (23), each of which has the profile of a trihedral prism including an input refracting face (24), a reflecting face (25) extending along the rear surface of the reflector, and an output refracting face (26), characterized in that it comprises a light ray absorber (3), embracing the light source (1) and reflector (2) at the side opposite to the light aperture (SS') of the device, the reflector (2) being provided with a blind aperture of a shape such that the focal ray (4) directed opposite to any focal ray (5) incident on the reflector (2) is incident on the absorber (3).

8. A light signalling device as claimed in claim 7, characterized in that the blind aperture of the reflector (2) is closed at the side of the output aperture of the collimator with a disc collecting lens (7), in which the connecting faces (29) of the refracting Fresnel rings are parallel to the collimator axis.

9. A light signalling device as claimed in claim 7, characterized in that the collimator parts are made of a transparent material have meridianal slits (30) filled with a black colorant.

10. A light signalling device as claimed in claim 7, characterized in that the plane (VV') of the blind aperture of the reflector (2) passes near the focal plane of the collimator, and the catadioptric rings (23) have such a profile that the optico-geometric ray connecting face (25) of each ring (23) defines with the normal to the surface of said face an angle ($\omega$) which is smaller than the maximum total internal reflection angle.

11. A light signalling device as claimed in claim 10, wherein the reflecting faces (25) of the catadioptric rings (23) are provided on the paraboloid rear surface of the reflector (2), characterized in that the reflecting face (25) of each ring (23) defines with the input face (24) and the output face (25) of the ring an angle $\nu$, which is calculated from the formula:

$$\nu = \arc \frac{\tan 1 - \cos\lambda}{\sqrt{n^2 - 1} - \sin\lambda}$$

wherein $\lambda = 45° - \arctan \frac{1 - \sin\rho}{2 - \cos\rho}$ wherein $\rho$ is the angle between the axis (00') of the collimator and the focal ray incident in the center of the input face (24) of the ring.

12. A light signalling device as claimed in claim 10, characterized in that the collimator includes an annular collecting lens (31) disposed in front of the focal plane, the axis of circular symmetry of said lens passing along the axis (00') of the collimator and the optical axis (FE) of its profile (meridianal section) passing through the common focal point (F) of the collimator and said lens (31) at an acute angle $\rho$ to the collimator axis, the reflecting faces (25) of the catadioptric rings (23) being provided on the conic rear surface of the reflector (2) flaring toward the output aperture of the collimator, the diameter of the blind aperture of the reflector (2) being at least equal to the maximum diameter of the annular lens (31), and the angle $\nu$ between the reflecting faces (25) and the input faces (24) of the catadioptric rings (23) being calculated from the formula:

$$\tan\nu = \frac{1 - \cos(\rho - \psi)}{\sqrt{n^2 - 1} - \sin(\rho - \psi)},$$

wherein $\psi$ is the taper angle of the reflector (2), namely the angle between the axis 00' and the conic rear surface of the reflector, and n is the refraction index of the material of the reflector (2).

13. A light signalling device as claimed in claim 7, characterized in that the taper angle of the reflector (2) is equal to half the angle ($\rho$) between the collimator axis (00') and the optical axis (FE) of the profile of the annular lens (31) and twice as large as the angle ($\nu$) between the reflecting surface and the refracting faces (24, 26) of the catadioptric rings (23).

14. A light signalling device as claimed in claim 7, characterized in that the output faces (26) of the catadioptric rings (23) of the reflector (2) are parallel to the optical axis (FE) of the profile of the annular lens (31), the thickness of the bearing layer of the reflector (2), namely the distance between the reflecting surface and the refraction faces 24, 26, and the width of the catadioptric rings (23) decreasing toward the output aperture of the collimator.

* * * * *